United States Patent Office 3,525,447
Patented Aug. 25, 1970

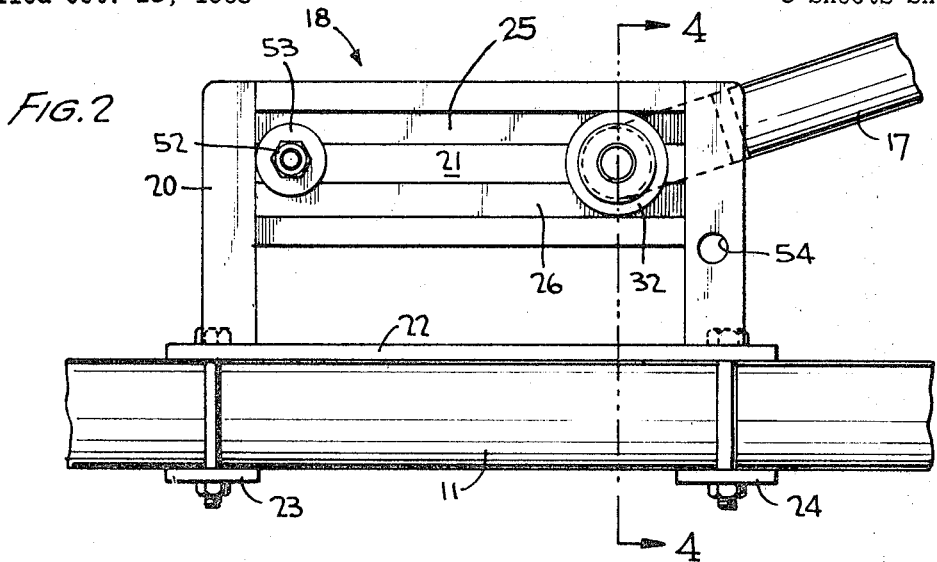
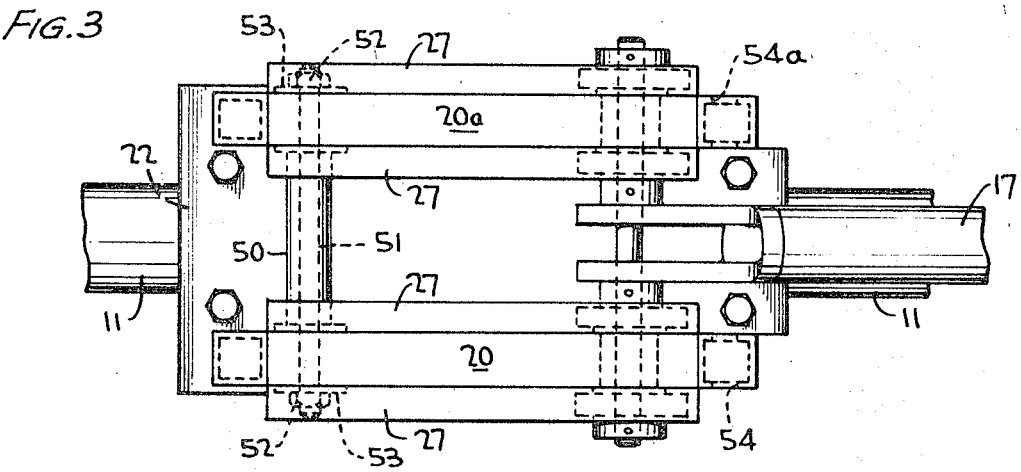
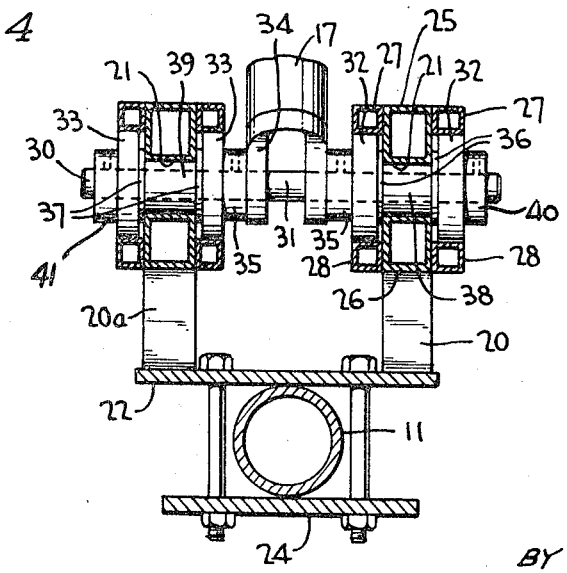

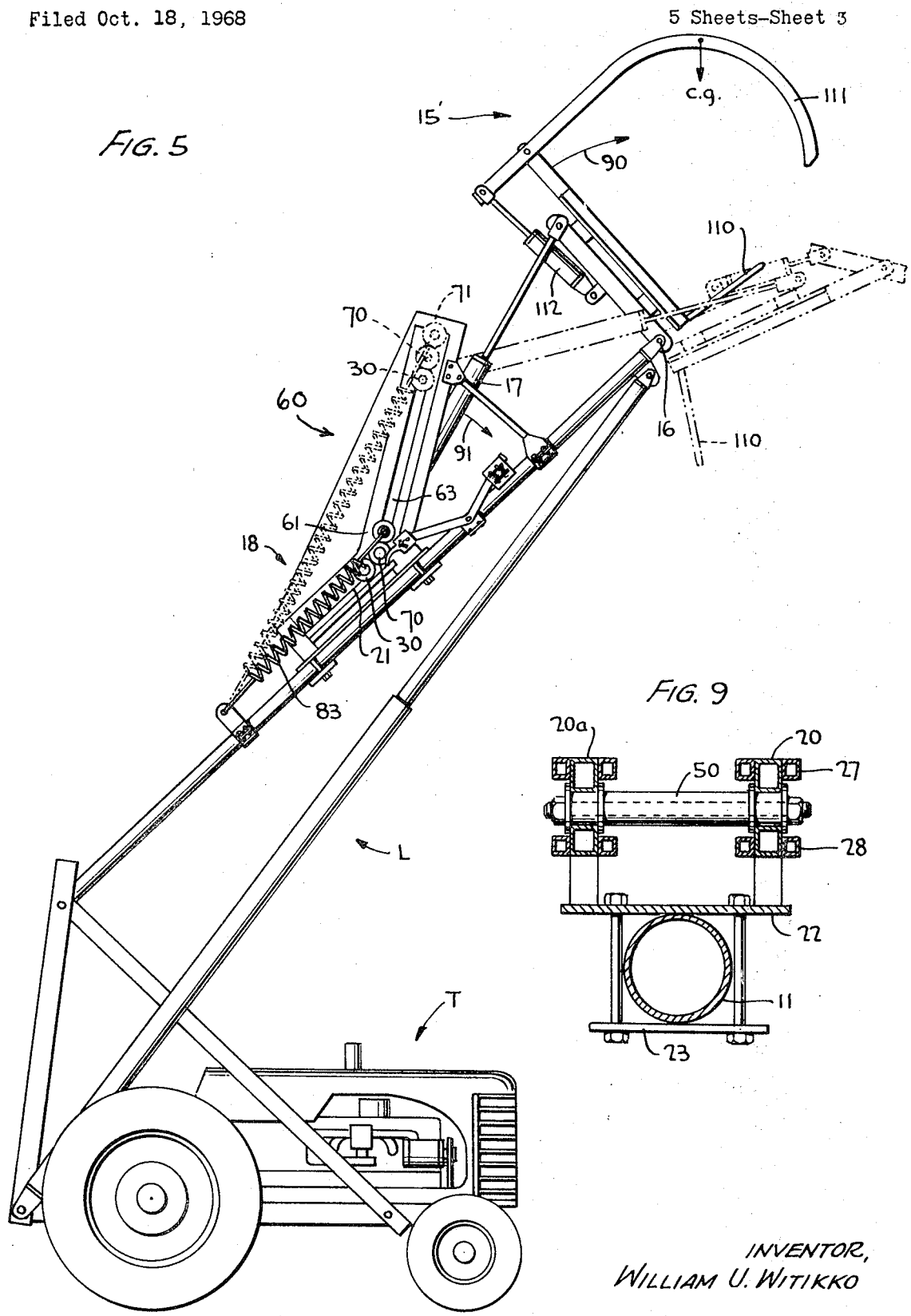

3,525,447
POWER OPERATED HAY HANDLING ATTACH-
MENT WITH FLOATING ACTION
William U. Witikko, 815½ 14th St.,
Bismarck, N. Dak. 58501
Filed Oct. 18, 1968, Ser. No. 768,656
Int. Cl. E02f 3/04
U.S. Cl. 214—767                                    20 Claims

ABSTRACT OF THE DISCLOSURE

Vehicle mounted attachments for handling material are disclosed which employ a power means for operating the material engaging implements with one end of the power means being mounted for floating action over a selected range of movement for use in control of the implement and to accommodate outside forces. The floating action is permitted by use of a runway along which a roller assembly attached to the base of the power means is adapted to travel. One embodiment includes the use of an angled runway extension for additional control capability with second and third roller assemblies serving to provide selective transfer to the second range of movement along the extension and to bias the assemblies toward the first range, respectively. Another embodiment includes the use of a second power cylinder for controlled movement of the roller assembly along the runway. A hay sweep implement and grapple fork implement are specifically disclosed as being capable of use as an integrated part of the attachments.

The present invention relates to material handling apparatus and, more particularly, to attachments for vehicles for picking up and carrying loose material, such as hay.

In the operation of a farm, there are many instances in which a quantity of material must be picked up and transported for depositing in another location. Such instances include, for example, the need for picking up and carrying hay or other loose type fodder from the ground after it has been cut and deposited in a discrete roll by a conventional angled hay rake. It has been found that a tractor mounted implement can efficiently perform this function by driving the tractor across the field in alignment with the roll with the implement adjacent the ground to sweep up a quantity of the hay, which is then transported to a central location, the implement raised to the required height, and the charge deposited to form a haystack. A similar tractor mounted implement but with a grapple feature is used during the winter months to go to the haystack and remove selected charges of feed from the top of the haystack and deposit the same onto the ground for the animals.

Such attachments for tractors employ a front loader type arrangement wherein the material engaging or implement means is in the form of a fork to support the charge of loose material. In particular, the hay sweep implement has tines which extend forwardly for positioning adjacent the ground to pick up the hay as the tractor moves forward; whereas, the implement for removing a charge of hay from a haystack includes a similar fork and a pivotal grapple attachment to present cooperating jaws that are able to actually grip the charge of hay. In performing these operations, there is of course a need for manipulating the implement to propely contact the material. Heretofore, these manipulations have been very time consuming and difficult to perform due to the inadequacy of the controls for the implements and the restriction on the amount of tilting movement of the implements which was allowed. Furthermore, the efficiency of prior arrangements has been adversely affected by the need for the operator to proceed with extreme caution to prevent outside forces acting on the implement from causing damage to the attachment.

Accordingly, it is one object of the present invention to provide a material handling attachment for a vehicle which overcomes the shortcomings of the prior art mentioned above by employing an improved control system.

It is another object of the present invention to provide an attachment of the type described wherein the power means between the vehicle and the implement is mounted for floating action over a selected range of movement to accommodate the outside forces acting on said implement.

It is still another object of the present invention to provide an attachment for a tractor wherein outside forces, such as gravity and engagement with the ground or other obstacle, are capable of providing useful pivotal movement for extending the tilting movement of the implement outside the basic control arc.

Proceeding to consider a brief description of the apparatus of the present invention, the attachment is adapted to be mounted on a conventional hydraulic loader of a vehicle and includes an elongated power means, which is preferably a fluid operated cylinder for positive control, attached between the loader and the implement and capable of operation so as to assist the operator in engaging the material through a basic tilting movement. The base of the fluid cylinder is mounted by a roller assembly for floating action on a runway for allowing an additional range of movement, which additional range is operative to give greater tilting capability by taking advantage of outside forces, such as gravity and force reaction by engagement of the implement with the ground or other fixed obstacle, which forces are utilized to manipulate the implement to effect the desired material contact. The floating action also advantageously allows a tilting movement to accommodate any undesirable or excess outside forces to prevent breakage of the attachment.

In accordance with specific features of the attachment of the present invention, the guide runway is designed to confine the movements of the base of the power cylinder to a fixed path by passing the shaft of the roller assembly through an upstanding guide member, which in turn has upper and lower tracks for engagement with the rollers carried by the shaft. For increased stability, the present invention contemplates the use of spaced support areas by providing a runway assembly wherein there is provided a pair of upstanding guide members with corresponding upper and lower tracks and a slot in lieu of a single member. Thus, the base of the power cylinder is mounted on the shaft between two pairs of guide rollers, which in turn through washers operatively engage the sides of the corresponding member for lateral or transverse stability. To maintain the adjacent rollers at a relatively wide spacing for still further stability, the guide members are preferably fabricated of tubular material, which also affords low weight and cost advantages.

One embodiment of the invention takes the form of an attachment with a single additional range of movement of the implement, which is particularly adapted for use as a hay sweep. This is so since the power cylinder is operative to give control movement of forward and rearward tilting motion for setting the implement to properly engage the material with the floating action coming into play to accommodate similar tilting movement over a range of movement due to changes in the contour of the ground.

In accordance with another salient feature of the present invention, a second and more versatile embodiment is provided wherein the guide runway includes a transfer station so as to provide first and second separate ranges of movement of the base of the power cylinder which provides two separate stages of manipulation of the implement. By providing the runway with two ranges of movement, the capability of the attachment is greatly increased. Thus, the first range allows the hay sweep implement to be used as described above, whereas the second range of movement extends the use of the attachment with a grapple fork implement. At the transfer station, a novel trip means is provided for disengaging a stop means, which normally confines the movement of the first range, to allow an automatic but controlled transfer of the roller assembly to which the base of the cylinder is attached to the second range. The provision of the extended movement over this second range at an inclined angle is of particular advantage in the manipulation of the grapple fork in that the power cylinder is made capable of moving past an over-center position at the pivot point of the implement. With such an arrangement the grapple fork can be tilted forwardly through an extended arc and thereby positioned to gain a downward bite on the material. A downward bite is needed, for example, in periodically removing the hay from a haystack where the top of the stack must be engaged due to the sides of the stack having become difficult if not impossible to penetrate with a grapple fork as a result of weathering.

In accordance with still more specific features of the present invention, the stop means at the transfer station is embodied in the form of a second roller assembly which is adapted for limited movement along the runway in juxtaposition with the first roller assembly. Thus, when the second roller assembly comes into mating engagement with a holding yoke at the transfer station it is operative to block the passage of the first roller assembly and thereby form the stop means. The release of the second roller assembly is automatically accomplished by a trip lever which is mounted in the path of bodily movement of the power cylinder so as to be responsive to the power cylinder passing the critical overcenter position. A third roller assembly is positioned in juxtaposition with the second roller assembly and spring biased toward the transfer station so that the first two roller assemblies are constantly urged by mutual engagement with the third toward the transfer station during movement along the second range. The spring action is helpful in controlling movement of the implement through the extended arc of movement and for aid in returning the base of the power cylinder to the transfer station after pickup of a load has been accomplished with the grapple fork.

Where the embodiment utilizing the three roller assemblies is used, I have found it desirable to discontinue the guide tracks at the transfer station with the guiding function of said assemblies being taken over along the second range by operation of the bushings within the guide slot. This prevents any resistance to movement of the roller assemblies which would occur if the rollers continued to rotate along the second range due to the tendency for counter rotation as a result of the peripheral frictional engagement of said rollers.

Still other objects and advantages of the present invention will become readily apparent to those skilled in this art from the following detailed description, wherein I have shown and described only the preferred embodiments of the invention, simply by way of illustration of the best modes contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

In the drawings:

FIG. 2 is a detailed side view of the runway of FIG. 1 which constitutes an important part of the attachment of the present invention;

FIG. 3 is a top view of the runway of FIG. 2;

FIG. 4 is a cross-sectional view taken along line 4—4 of FIG. 2 showing the construction of the roller assembly;

FIG. 5 is a side view of a tractor illustrating a second embodiment of the attachment of the present invention particularly adapted for use with a grapple fork implement;

FIG. 9 is a cross-sectional view taken along line 9—9 of FIG. 6 showing the construction of the limit stop for the runway.

Figure 1:
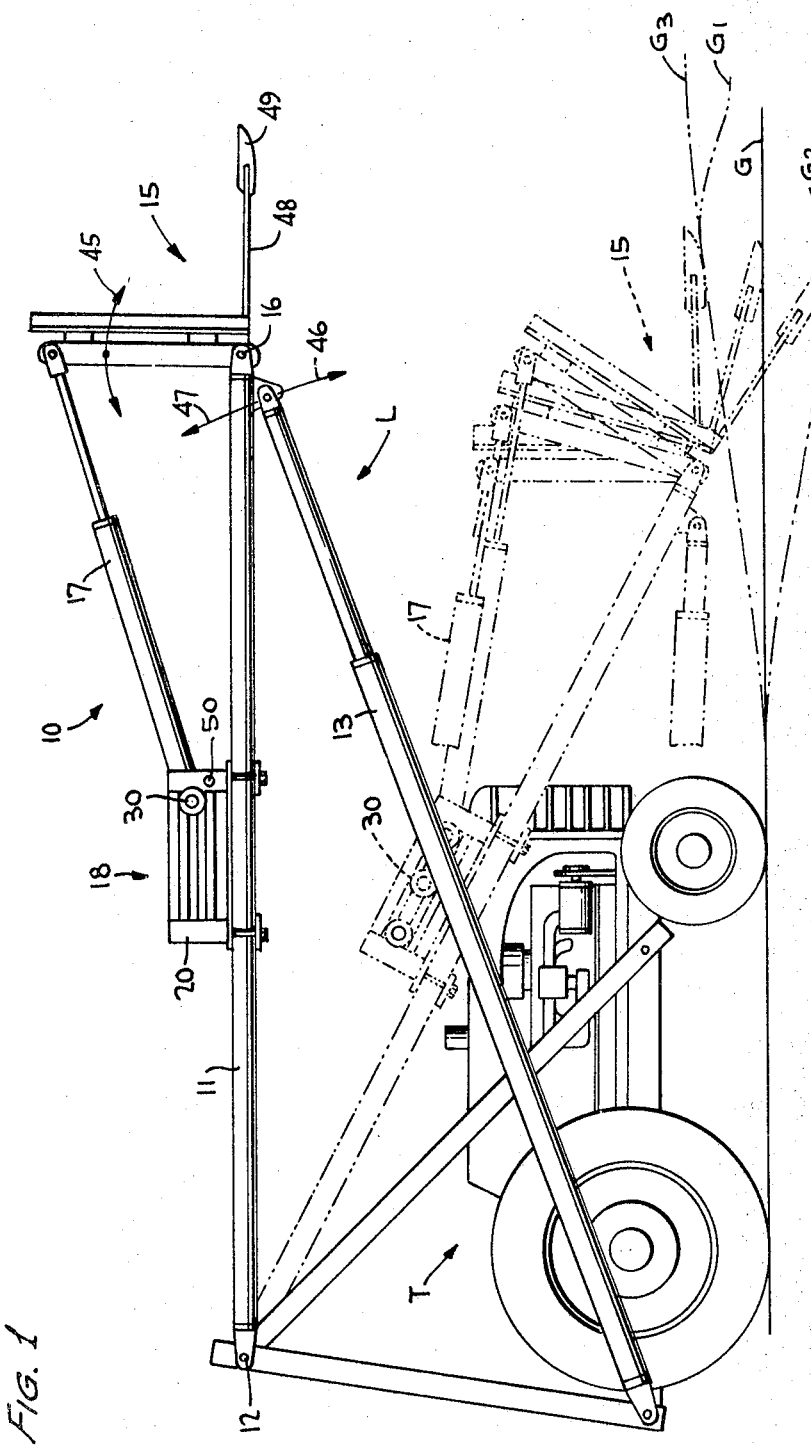
FIG. 1 is a side view of a tractor with an attachment constructed in accordance with the principles of the present invention including a hay sweep implement.

With reference now to FIG. 1 of the drawings, a more detailed description of the invention can be given by describing the first embodiment illustrated for the purpose of disclosing the principles of said invention. As indicated above, the apparatus of the invention is adapted for use on a vehicle, such as a tractor T having a typical front-end hydraulic loader L mounted thereon. As is shown in this figure, there is provided a material handling attachment 10 on the loader L incorporating the principles of the present invention. Specifically, the attachment 10 is mounted on a boom 11 which is pivotally mounted about a horizontal axis 12 for movement in a vertical direction in response to actuation of a hydraulic cylinder 13. While this embodiment of the invention as well as the later explained embodiments are particularly adapted for use on a tractor having a front-end loader and will thus be described in this environment for convenience, it should be clear to those skilled in the art that any other type of vehicle and basic movable loader frame could be used for providing a suitable environment for the attachment 10.

The attachment 10 may comprise a material engaging implement, generally designated by the reference numeral 15, which is pivotally mounted on the free end of the boom 11 about a horizontal pivot point 16. A power cylinder 17 is provided and has its piston rod attached to the upper end of said implement 15 for controlling the tilting movement of said implement 15, is will later be explained in detail. A runway assembly, generally designated by the reference numeral 18, mounts the base of the hydraulic power cylinder 17 for floating action along the length of the boom 11 and thereby mounts the implement 15 for additional and free floating tilting movement in accordance with the invention. In the full line showing of FIG. 1, the boom 11 is raised so as to carry the implement 15 well above ground level G, which position is utilized for traveling between jobs whereby the visibility of the operator of the tractor T is not obstructed.

The specific details of the runway assembly 18 can best be seen in FIGS. 2–4 to comprise spaced guide members or runways 20, 20a having aligned slots 21 extending along the boom 11, i.e., in the desired direction of floating movement of the base of the power cylinder 17. The runways 20, 20a are generally U-shaped and mounted in an inverted position on a base plate 22 by welding or other suitable means. As illustrated, the base plate 22 is supported along the top of the boom 11 through use of a pair of U-shaped clamps 23, 24, which can be easily loosened and retightened to adjustably position the runway assembly 18 along said boom 11, as required by the selected range of tilting of the implement 10. Since the construction of the guide runways 20, 20a is indentical, only the runway 20 and its cooperating parts will be discussed below for simplicity and ease of description; it being understood that the identical reference numbers are utilized with respect to the runway 20a where appropriate.

Thus, the guide member runway 20 is fabricated of tubular stock of a strong metal which is welded together to provide upper and lower runners 25, 26 defining the guide slot 21 with welded upper and lower roller guide tracks or flanges 27, 28 which also may be made of tubular stock (see FIG. 4) extending along said runway 20. A first roller assembly 30, which includes a shaft 31 and two pairs of guide rollers 32, 33, is carried so that the shaft 31 passes through the slots 21 and the rollers 32, 33 are positioned to be guided by the flanges 27, 28 along their range of floating movement. Actually, the flanges 27, 28 are spaced slightly further apart than the diameter of the rollers 32, 33 whereby said rollers 32, 33 can assume engagement with either the upper or lower flanges 27, 28 depending upon the tilting forces acting on the implement 15 for substantially resistance-free rolling action of the assembly 30. The shaft 31 carries a mounting yoke 34 for the base of the power cylinder 17, which is maintained in a centered position by a pair of locking collars 35 (see FIG. 4). The rollers 32, 33 are relatively widely spaced from each other by the hollow runners 25, 26 and guided laterally with respect to the runways 20, 20a by pairs of washers 36, 37 contacting the sides of said runners 25, 26. Bushings 38, 39 are positioned between the respective washers 36, 37 and serve to guidingly space the shaft 31 within the inside guide faces of the runners 25, 26 upon loss for any reason of the guiding function by said flanges 27, 28 through said rollers 32, 33. End locking collars 40, 41 are positioned on the shaft 31 to retain the parts including the correspoding outside rollers 32, 33 on the shaft 31 and to thereby complete the roller assembly 30.

The implement 15 can be moved through a control arc, as represented by the arrow 45 in FIG. 1, by a simply applying the necessary hydraulic pressure to the power cylinder 17. Since the base of the cylinder 17 is free to move rearwardly along the runway assembly 18 due to its mounting on the roller assembly 30, it is necessary to prevent such movement, especially when no load is being carried, to keep the hydraulic loader L tilted sufficiently downwardly, as indicated by the arrow 46, such that the center of gravity of the implement 15 is to the right with respect to the pivot axis 16, as viewed in this figure. If, on the other hand, it is desired to pivot the implement 15 rearwardly through an additional arc for any purpose, such as to insure gainst a load rolling off the front of the implement, the operator then intentionally tilts the loader L rearwardly, as denoted by the arrow 47, and/or tilts the implement 15 itself rearwardly by operation of the cylinder 17, in which case the center of gravity of the implement 15 is shifted over center to cause the roller assembly 30 to move back along the runway assembly 18. It can accordingly be seen that with the attachment 10 of the present invention, an additional arc of movement of the implement 15 can be gained by advantageous use of an outside force, that is, gravity.

The particular implement 15 illustrated in FIG. 1 embodiment has a plurality of outwardly extending tines 48 with suitable guides 49 on the outer ends thereof. Such an implement 15 is adapted to lift any load from underneath in the manner of a conventional fork lift but this illustrated construction is best adapted for positioning adjacent the ground G to sweep up hay in its path as it is moved forward by the tractor T.

In a typical hay sweeping operation, the hay sweep implement 15, starting from the full line position of FIG. 1, is first lowered into engagement with the ground G by lowering the loader L in the direction of arrow 46. After the ground G has been engaged by the guides 49, lowering preferably continues until the middle dotted line position is reached: this added movement resulting from the floating action of the roller assembly 30 along the runway members 20, 20a of the runway assembly 18. Then, when a change in contour of the ground G occurs, such as a rise as noted at $G_1$, the base of the power cylinder 17 is permitted to move freely along the runway assembly 18 to the rearmost position thereby tilting the implement 15 rearwardly whereby the rise $G_1$ is accommodated and thus no breakage or straining of the parts can occur. Similarly, when a dip or valley is approached, as denoted by $G_2$, then the hay sweep implement 15 is allowed to tilt a corresponding distance forwardly, thus bringing the roller assembly 30 to the forwardmost position along the runway assembly 18 so as to cause the implement 15 to follow the contour and insure a clean pickup of the hay.

Any abnormal additional change in ground level as denoted at $G_3$ can be recognized by the operator in advance and due to the lead time afforded by the floating action, the desired rough compensation can be made with ease. That is, by the operator merely keeping his eyes on the position of the roller assembly 30 and operating the controls of either the hydraulic loader cylinder 13 or the power cylinder 17, the tines 48 accurately follow the ground to give a complete and efficient sweeping action heretofore not possible.

In some cases, it may be desirable to limit the movement of the roller assembly 30 along the range of the runway assembly 18 so as to confine the additional arc of movement to some specific value. For this purpose, an auxiliary feature is provided in the form of a limiting stop cylinder 50 positioned to span the distance between the runway members 20, 20a (FIG. 3); a bolt 51 and nuts 52 at the ends thereof being adapted to draw washers 53 and the ends of the cylinder 50 into frictional locking engagement with the runners 25, 26. Accordingly, when the inside rollers 32, 33 engage the cylinder 50 further movement is prevented and the arc of movement of the implement 15 correspondingly confined as desired. As will be clear, the cylinder 50 may be easily adjusted along the length of the runners 25, 26 by loosening at least one nut 52, shifting the cylinder 50 as desired and retightening the nut 52. Further, locking cylinders 50 may be employed at both ends of the runners 25, 26 if desired with infinite adjusting movement of both being available; the latter feature obviously including spacing from each other by a distance equal to the diameter of the rollers 32, 33 so that the floating action is eliminated if desired.

Other implements found on the farm that can be substituted for the hay sweep implement of FIG. 1 include, for example, a scraper or a front-end loader. In these instances the floating action of the attachment 10 of the present invention can be used to advantage in the same manner described above. However, particularly with these two implements, nonfloating control may be desired in which case the multiple stop cylinders 50 described above may be put to advantageous use. Alternatively, the mounting yoke 34 of the base of the cylinder 17 may be removed from the shaft 21 and anchored instead by mounting on an auxiliary shaft (not shown) passing through apertures 54, 54a in the members 20, 20a, respectively (see FIG. 3). Also, the arc through which any implements 15 is movable by operation of the power cylinder 17 may be preset by manually shifting of the runway assembly 18 along the boom 11 by using the clamps 23, 24; all of these auxiliary features thus further adding to the versatility of the attachment 10.

With reference now to FIG. 5, an attachment 10' illustrating features of the second embodiment of the invention will be described; it being understood that parts corresponding in function to parts illustrated and described with respect to the FIG. 1 embodiment bear the same reference numerals for convenience and will not be redescribed. While the embodiment of FIG. 5 is capable of gaining the same results and advantages as the FIG. 1 embodiment, it will be seen to have additional features which lend to it greater capabilities and performance, so that at least in this respect it can be considered to be the preferred embodiment.

Accordingly, referring to FIG. 5, the runway assembly 18 in this embodiment has a guideway extension, generally designated by the reference numeral 60 and extending from an angular intersection 61 in an upward and forward direction at an angle of approximately 45 degrees. The guide roller assembly 30 (see FIGS. 6 and 6a also) still mounts the base of the power cylinder 17 for movement along the first selected range as defined by the slot 21 in the upstanding guide runways 20, 20a, as explained above. As a reinforcement for the tubular construction of the guide runways 20, 20a and the tubular construction of the extension 60, a web plate 62 is suitably welded to the outer peripheral face thereof, as clearly shown in both FIGS. 6 and 6a.

The slot 21 is made continuous from the guideway member 20 past the intersection 61 and into the extension 60, as denoted by slot 63. Just as with the guide slot 21, the slot 63 is formed by the opposed faces of upper and lower runners 64, 65 and an additional limiting stop cylinder 66 may be provided at the terminal end of the slot 63, if desired. To assure that the runway extension 60 is rigidly and thus accurately supported as the roller assembly 30 and thus the force of the power cylinder 17 is moved to the limit position adjacent the stop cylinder 66, a suitable support strut 67 attached by bracket 68 to the web 62 and by bracket 69 to the boom 11 is employed.

Figure 6:
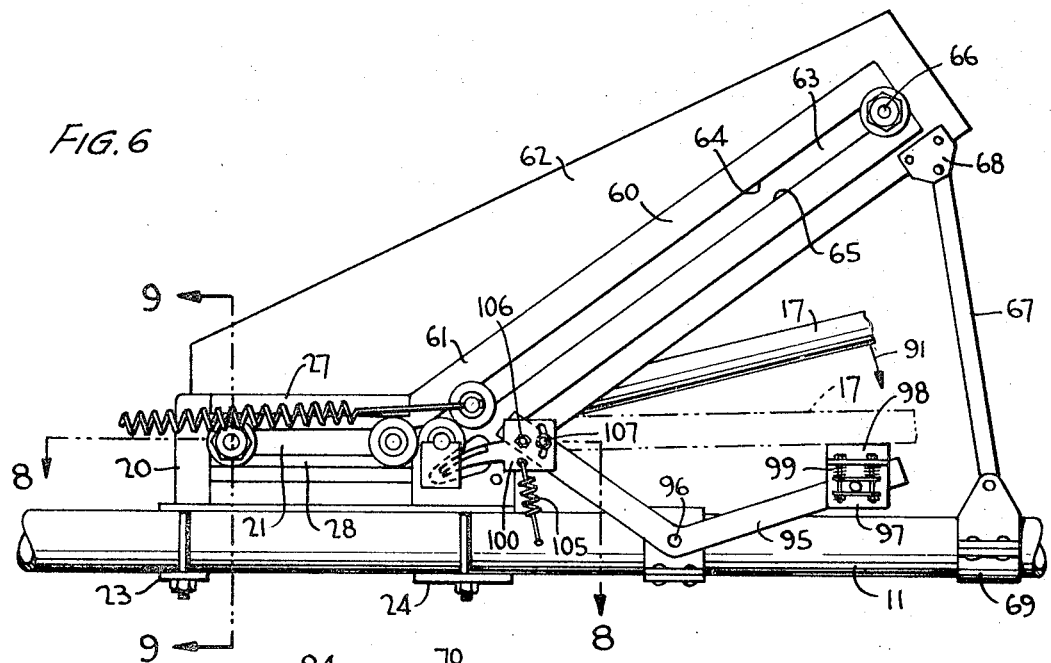
FIG. 6 is a detailed side view of the runway shown in FIG. 5 which allows multiple range control movement.
Figure 6A:
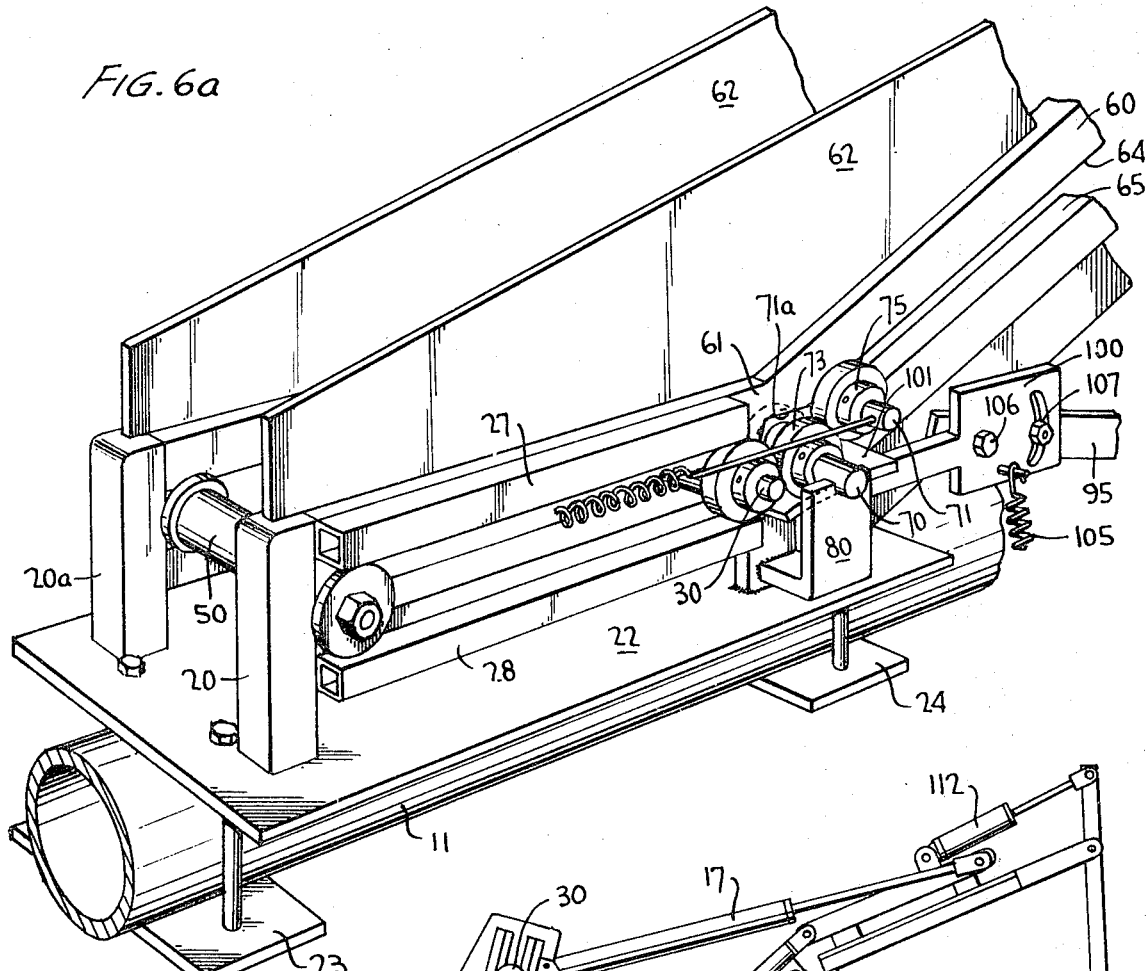
FIG. 6a is an enlarged perspective view of a portion of the runway shown in FIG. 6.

It can be noted from viewing FIGS. 6 and 6a that the upper and lower tracks 27, 28 respectively are terminated adjacent the angular intersection 61 so that the guiding function of the roller assembly 30, and the additional roller assemblies, is performed by the runners 64, 65 engaging the rotatable bushings 38, 39 mounted on the shaft 31. This arrangement is of importance for reasons which will become clear during the discussion of the second or stop roller assembly 70 and the third or biasing roller assembly 71 that presently follows.

The connection between the slot 21 and the slot 63 is provided with an upward jog at the intersection 61, as shown at 71a in FIG. 6a. This allows upward movement of the roller assemblies 30, 70, 71 at the intersection 61 for a purpose which will later be described in detail. Also, for properly guiding the assemblies without undue frictional resistance, it can be understood that the runners 64, 65 are spaced apart silghtly more than the diameter of the bushings 38, 39 so that the roller assembly 30 can have the requisite free floating action along the slot 63.

Figure 7:
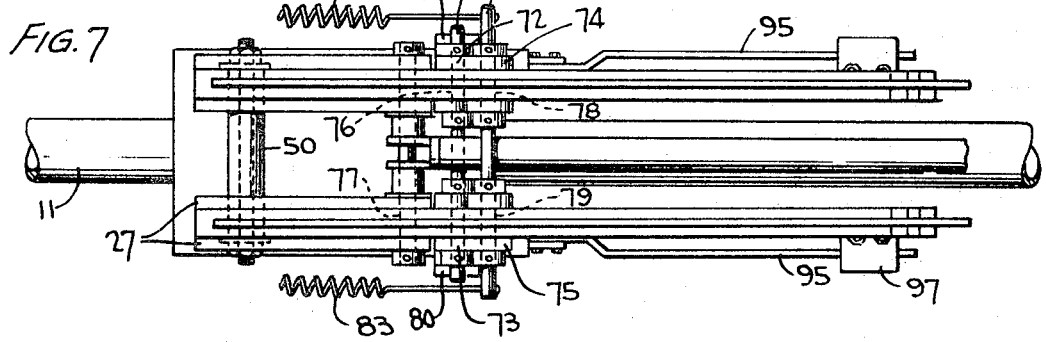
FIG. 7 is a top view of the runway of FIG. 6.
Figure 8:
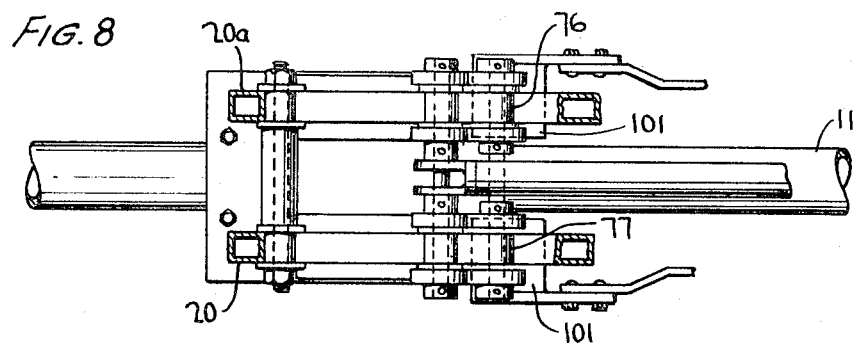
FIG. 8 is a cross-sectional view taken along line 8—8 of FIG. 6.

Reference is now made to FIGS. 7 and 8 of the drawings, wherein the second and third roller assemblies 70, 71 are shown in sufficient detail that their relationship to the first roller assembly 30 can be understood.

As illustrated, the roller assemblies 70, 71 are generally of the same construction as the roller assembly 30 in that each includes two pairs of rollers 72, 73 and 74, 75, respectively. Also, the adjacent ones of rollers 72–75 are separated by bushing and washer combinations 76, 77 and 78, 79, respectively, which serve to guide the roller assemblies 70 71 with respect to the runners 64, 65 in a fashion identical to the guiding of the roller assembly 30.

The function of the second roller assembly 70 is to block the transfer of the operating roller assembly 30 from movement between the first range afforded by the slot 21 and the second range afforded by the slots 63. For this purpose, a pair of saddles or yokes 80, 81 (note FIGS. 6a and 7) are attached to the upstanding guide members 20, 20a so as to receive the extended end portions of the shaft of the roller assembly 70, as illustrated in these figures.

The ends of the shaft of roller assembly 71 extend outwardly beyond the ends of the shaft for the second roller assembly 70 and receive biasing springs 83, 84 for constantly urging the third roller assembly 71 into juxtaposition or frictional contact with the second roller assembly 70. This means that the second roller assembly is constantly urged into the direction of the intersection 61 for positioning in the saddles 80, 81 in the blocking position. These springs 83, 84 serve to insure firm engagement of the ends of the shaft of the second roller assembly 70 in the saddles 80, 81 so as not to become dislodged by bumps and jars that might occur during operation of the tractor T or the hydraulic loader L.

Thus, as the roller assembly 70 moves down the guide extension 60, the saddles 80, 81 prevent any further movement past the intersection 61 into the first range of movement along the slot 21. With the second roller assembly 70 thus resting in the saddles 80, 81, the first roller assembly 30 is blocked from movement into the intersection 61 and thus into the runway extension 60. This is so since the tendency of the roller assembly 30 to move forward from the action of the cylinder 17 causes the shaft of second roller assembly 70 to be forced against the right wall of the saddles 80, 81 (as viewed in FIGS. 6 and 6a) which is perpendicular to the direction of movement.

It can now be confirmed that the attachment 10' is thus capable of control movement with floating action along a first range of movement exactly as the attachment 10 of the previous embodiment. As a result, the hay sweep implement 15 could accordingly be an integral part of the attachment 10' whereby the advantageous results as described with the FIG. 1 embodiment would be realized. When the attachment 10' is thus used to provide the control system for the hay sweep implement 15, it may be desirable to position the limit cylinder 66 in juxaposition with the third roller assembly 71 so as to positively exclude any chance of movement along the runway extension 60.

In accordance with an important feature of the attachment 10' is the feature that allows the roller assembly 30 to be held captive along the first range of movement, as in the FIG. 1 embodiment, then upon demand can automatically be transferred at a tranfser point corresponding to the angular intersection 61 by release of the second roller assembly 70 from the saddles 80, 81. Thus, with the first roller assembly 30 in the position shown by the full line outline of FIG. 5, the power cylinder 17 can be actuated to pivot the implement 15' through the normal control arc, just as in the FIG. 1 embodiment. However, as the limit of the forward tilting action resulting from operation of the power cylinder 17 as denoted by the arrow 90 in this figure is approached, the power cylinder is being bodily moved (as denoted by the arrow 91 in FIGS. 5 and 6) between the full line and dotted line position (FIG. 6) and finally into parallel relationship with the boom 11. At this point it should be noted that without the provision for the movement of the roller assembly 30 along the second range of movement as provided by the runway extension 60, this would be the limit of tilting capability of the implement 15', and would prevent a necessary operation in the handling of hay from a haystack.

Thus, as the power cylinder 17 approaches the dotted line position of FIG. 6, a pair of trip levers 95 (FIG. 7) are pivoted about a pivot point 96 in response to the engagement of the cylinder 17 with actuator shoes 97. As shown in FIG. 6, the actuator shoes 97 may be provided with an upper cushioning cap 98 which is mounted by springs 99 on the shoe 97 to thereby allow slight overtravel of the cylinder 17 without damage to the trip lever 95.

The opposite and operative end of each of the trip levers 95 carries pusher assembly 100 which is positioned so as to present in upwardly facing pushing face 101 (see FIG. 8) positioned through openings in the runways 20, 20a for engagement under the stop roller assembly 70. Thus, as the power cylinder 17 reaches the critical overcenter position, as denoted by the dotted line position of FIG. 6, the face 101 of the assembly 100 will be operative to push against the rollers 72, 73 and move the assembly 70 upwardly free of its captive position in the saddles 80, 81. As will be recalled, this movement is allowed by the cutout portion 71a of the slot 63, as shown in FIG. 6a. To insure the return of the trip lever 95 to the normal position of FIG. 6, a return spring 105 may be attached to the pusher assembly 100 which is itself pivoted at 106 on the lever 95 for adjustment of the relative position of said lever 95 by operation of a bolt and curved slot combination 107; thus giving the capability of adjusting the release point of the roller assembly 70 for most efficient operation.

When the overcenter position of the power cylinder 17 has been reached and the second roller assembly 70 releases as just described, the trio of roller assemblies 30, 70, 71 will move upwardly along the runway extension 60 with the rollers in peripheral contact as shown by the dotted line position of FIG. 5. This movement will be recognized as being a result of the operation of gravity on the implement 15'. Advantageously, as the trio of rollers 30, 70, 71 approaches the terminal portion of the runway extension 60, the springs 83, 84 become more and more effective to slow the forward tilting movement and thus prevent any chance for runaway tilting and damage to the implement 15' by shock or jarring at the dotted line limit position of this figure.

From the above description of the FIG. 5 embodiment, it should now be realized by those skilled in the art that the tilting action afforded by the attachment 10' is particularly suited for use with the grapple fork implement 15', which has been illustrated for purposes of disclosing the invention. The grapple fork implement 15' utilizes a plurality of forwardly extending tines 110 with a plurality of curved, downwardly extending grapple hooks 111, which may be opened and closed by a conventional fluid cylinder 112 to effect a clamping on material to pick up the same.

With this particular grapple fork implement 15' in the dotted line position of FIG. 5, the tines 110 extend downwardly with the grapple hook in the open position (as partially shown) to provide an open mouth for movement down onto the material to be picked up. As a result, a downward bite is gained once the cylinder 112 has been operated to pivot the same to the closed position (note closed position of implement 15' in FIG. 10). The result then is that the outside force, namely gravity, is operative to cause the movement of the implement 15' through the additional arc of movement about the pivot point 16 on the loader L to gain a bite into the top of a haystack whereby loose hay can be removed efficiently and with ease for depositing on the ground to feed the animals, as described.

When it is desired to return the tilted implement 15' to the original control arc of movement as afforded by the power cylinder 17, the operator need only use the outside force of a downward pushing action of the implement 15' (by operating the loader L) against the top of the haystack or other fixed object; the use of this outside force being advantageously in combination with the biasing force of the springs 83, 84. Thus, the power cylinder 17, while in its dotted line position of FIG. 5, can be operated so as to return the roller assembly 30 down the runway extension 60 past the intersection 61 and into the first range of movement along the guide runway assembly 18. The second or stop roller assembly 70 is returned to enter the saddles 80, 81 and holds the roller assembly 30 captive until released again by overcenter movement of the power cylinder 17.

Figure 10:
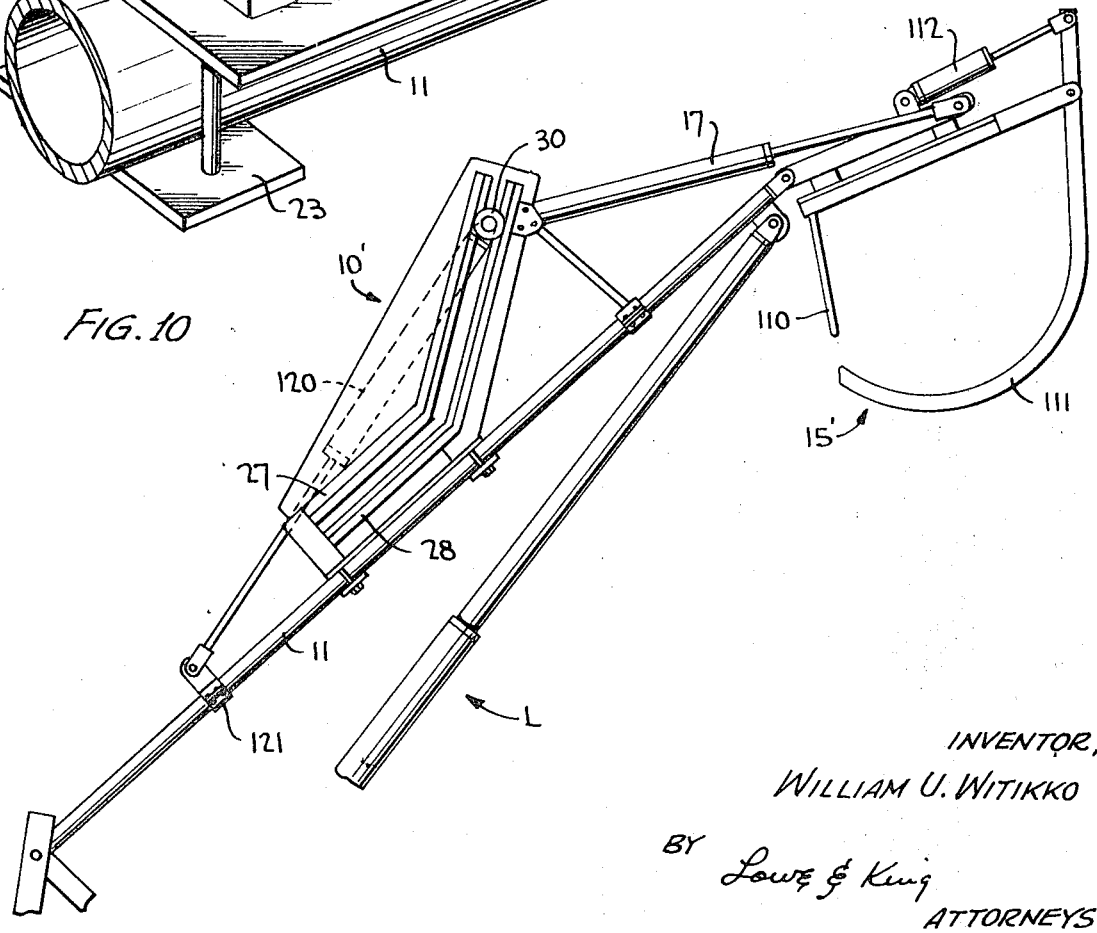
FIG. 10 is a side view of a modified embodiment of the attachment of the present invention.

A modified embodiment of the attachment 10' for operating a grapple fork implement 15' is illustrated in FIG. 10. In this figure, the upper and lower tracks or flanges 27, 28 extend through the intersection 61 and upwardly along the runway extension 60 so that the roller assembly 30 is positively guided by the rollers 32, 33 along both the first and second ranges of travel. In lieu of the locking and spring return features of the roller assembly 70, 71, respectively, an additional power cylinder 120 is provided having its base fixed to the roller assembly 30 and the end of its piston rod fixed to a suitable clamp 121 on the boom 11. With this arrangement it can be seen that the outside forces, namely gravity and engagement with the ground or obstacle, may be overcome by selective operation of the power cylinder 120 to control the tilting action of the implement 15'. This modified embodiment thus gives a positive control of the movement, which in the other embodiments is accomplished by reliance on the outside forces, and accordingly may be preferred in vehicle attachments in which more positive control of the tilting action of the implements is desired.

In this disclosure, there is shown and described only the preferred embodiments of the invention, but, as aforementioned, it is to be understood that the invention is capable of use in various other combinations and environments and is capable of changes or modifications within the scope of the inventive concept as expressed by the accompanying claims.

I claim:

1. An attachment to be mounted on a vehicle for handling material comprising implement means for engaging the material to be handled, elongated power means having one end attached for free pivotal movement to said implement means and the other end attached for free pivotal movement to said vehicle for effecting control movement thereof to assist in engaging said material, and means to allow free floating action of one of said ends of said power means without actuation of said power means over a selected range of movement to use for control and to accommodate outside forces acting on said implement means.

2. The attachment of claim 1 wherein said power means comprises a fluid operated cylinder for positive control of said implement means.

3. The attachment of claim 1 wherein said means to allow floating action comprises a guide runway mounted on said vehicle and a roller assembly carried by said other end of said power means for rolling action along said runway.

4. The attachment of claim 3 wherein said runway forms a part of a runway assembly which further comprises a base attached to said vehicle, at least one upstanding guide member on said base, upper and lower pairs of guide tracks mounted on each side of said member, and an elongated slot formed in said member and paralleling said tracks, said roller assembly passing through said slot and operatively engaging said tracks, whereby said rolling action is confined to a fixed path defined by said tracks.

5. The attachment of claim 4 wherein said roller assembly comprises a shaft attached to said other end of said power means, a guide roller on said shaft for each pair of tracks, a bushing on said shaft between the rollers and positioned in said slot, and washers between said rollers for engaging the side faces of said member, whereby said roller assembly is held against sidewise movement along said runway.

6. The attachment of claim 5 wherein said guide member is of tubular construction for spacing of said adjacent rollers and increased stability of said roller assembly.

7. The attachment of claim 4 wherein said runway assembly further comprises an additional upstanding guide member on said base extending parallel to the first guide member and having corresponding guide tracks and slot, said roller assembly passing through said slot and operatively engaging said tracks, whereby said roller assembly is stabilized at spaced support areas by said runway assembly.

8. The attachment of claim 3 wherein is further included stop means at a transfer station along said runway to provide first and second separate ranges of movement and trip means for disengaging said stop means to allow transfer of said roller assembly from said first range to said second range.

9. The attachment of claim 3 wherein is further provided a limit stop means mounted along said runway to block movement of said roller assembly as desired.

10. The attachment of claim 3 wherein is further provided auxiliary means on said runway to attach said other end of said power means to selectively provide nonfloating action of said implement.

11. The attachment of claim 8 wherein said stop means includes a second roller assembly for movement along said runway in juxtaposition with the first roller assembly and holding means positioned along said runway at said transfer station restricting movement of said second roller assembly to block the passage of said first roller assembly.

12. The attachment of claim 11 wherein said power means is mounted for bodily movement while effecting said control movement, and wherein said trip means includes a pivotal lever, one end of said lever being positioned in the path of movement of said power means, the opposite end of said lever having means for pushing said second roller assembly free of said holding means to effect release of said first roller assembly.

13. The attachment of claim 12 wherein is provided a third roller assembly for movement along said runway in juxtaposition with the second roller assembly and spring means for urging said third roller assembly against said second roller assembly to bias the latter toward operative engagement with said holding means, whereby said first and second roller assemblies are spring biased for return movement toward said first range during movement along said second range.

14. The attachment of claim 12 wherein said holding means comprises saddle means positioned to receive said second roller assembly and pushing means includes a pad positioned for engagement under the roller assembly to lift the same free of said saddle means.

15. The attachment of claim 14 wherein is provided means for adjusting the angular relationship between said pad and said pivotal lever whereby the release point may be varied.

16. The attachment of claim 8 wherein said runway forms a part of a runway assembly which further comprises a base attached to said vehicle, at least one upstanding guide member on said base, upper and lower pairs of guide tracks mounted on each side of said member, and an elongated slot formed in said member and paralleling said tracks, said roller assembly passing through said slot and operatively engaging said tracks, said pairs of tracks being positioned along said first range and discontinued adjacent said transfer station, said slot being formed by opposed runner surfaces, said runner surfaces engaging said roller assembly spaced from said rollers to guide the assembly at said transfer station and along said second range to prevent counter rotation resistance to movement of said rollers.

17. The attachment of claim 8 wherein said implement means is pivotally mounted for tilting movement in a control arc in response to the actuation of said power means at said transfer station, said runway along said first range allowing said floating action to permit a first additional arc of movement adjacent one limit of said control arc, said power means having an overcenter position at the opposite limit of said control arc, an angular intersection in said runway formed at said transfer station, said trip means being responsive to the movement of said power means to said overcenter position whereby a second additional arc of tilting movement of said implement means is allowed by said floating action of said power means along said second range.

18. The attachment of claim 1 wherein is further provided a second power means attached between said means to allow floating action and said vehicle to override said outside forces as desired.

19. The attachment of claim 1 wherein said implement means includes a fork member for movement along the ground to sweep the material from the ground, said fork member being pivotally attached to said vehicle for allowing said control movement in a control arc, and said means to allow floating action being effective to allow an additional arc of movement to compensate for variation in contour of said ground.

20. The attachment of claim 1 wherein said implement means includes a grapple fork pivotally attached to said vehicle and having the control movement through a control arc, said means to allow floating action including a runway serving to permit first and second additional arcs of movement adjacent opposite limits of said control arc, said first arc permitting rearward tilting action of said grapple fork, said second arc accommodating forward tilting action to allow a downward bite of said grapple fork on said material.

References Cited
UNITED STATES PATENTS 2,451,101 10/1948 Leschinsky _____ 214—778
3,305,118 2/1967 Lull _____ 214—767

HUGO O. SCHULZ, Primary Examiner

U.S. Cl. X.R.

214—778, 147